United States Patent
Van Vechten et al.

(10) Patent No.: US 8,671,416 B2
(45) Date of Patent: Mar. 11, 2014

(54) DYNAMIC SERVICE DISCOVERY

(75) Inventors: Kevin J. Van Vechten, San Francisco, CA (US); Damien Pascal Sorresso, San Francisco, CA (US); Richard L. Hagy, Montara, CA (US); Ivan Krstic, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 532 days.

(21) Appl. No.: 13/007,517

(22) Filed: Jan. 14, 2011

(65) Prior Publication Data

US 2012/0185879 A1    Jul. 19, 2012

(51) Int. Cl.
*G06F 9/44* (2006.01)
*G06F 15/16* (2006.01)

(52) U.S. Cl.
USPC .......................................... 719/328; 709/203

(58) Field of Classification Search
None
See application file for complete search history.

(56) References Cited

U.S. PATENT DOCUMENTS

| | | | |
|---|---|---|---|
| 5,410,698 A | 4/1995 | Danneels et al. | |
| 6,813,637 B2 | 11/2004 | Cable | |
| 8,489,759 B2 * | 7/2013 | Parham et al. | 709/231 |
| 2004/0122774 A1 | 6/2004 | Studd et al. | |
| 2005/0021594 A1 * | 1/2005 | Bernardin et al. | 709/200 |
| 2005/0246726 A1 * | 11/2005 | Labrou et al. | 719/328 |
| 2006/0015505 A1 | 1/2006 | Henseler et al. | |
| 2006/0037031 A1 * | 2/2006 | Colle et al. | 719/328 |
| 2006/0179440 A1 * | 8/2006 | Besbris et al. | 719/328 |
| 2009/0204612 A1 * | 8/2009 | Keshavarz-Nia et al. | 707/6 |
| 2010/0057835 A1 * | 3/2010 | Little | 709/203 |
| 2011/0004737 A1 | 1/2011 | Greenebaum | |
| 2011/0041141 A1 * | 2/2011 | Harm et al. | 719/318 |
| 2012/0166246 A1 * | 6/2012 | Simon | 705/7.26 |

\* cited by examiner

*Primary Examiner* — Charles E Anya
(74) *Attorney, Agent, or Firm* — Blakely, Sokoloff, Taylor & Zafman LLP

(57) ABSTRACT

When an application is launched, a framework scanning module scans a plurality of frameworks linked against by the application to generate a list of available services. When the application makes a request of a particular service, a service verification module compares the requested service to the list of available services and if the requested service is found in the list of available services, sends a signal to the application, the signal allowing access to the requested service for the application. Otherwise, access to the requested service is denied.

21 Claims, 5 Drawing Sheets

| 252 Service Name (ID) | Application.app 254 Path | 256 Instance Designation |
|---|---|---|
| com.apple.coreaudio.xpc | /system/library/frameworks/coreaudio.framework/XPC services/ | global |
| com.apple.windowserver.xpc | /system/library/frameworks/coregraphics.framework/XPC services/ | global |
| ⋮ | ⋮ | |
| com.apple.serviceN.xpc | /system/library/frameworks/frameworkN.framework/XPC services/ | per application |

Fig. 2B

DYNAMIC SERVICE DISCOVERY

TECHNICAL FIELD

This invention relates to the field of inter-process communications and, in particular, to dynamic service discovery using linked frameworks.

BACKGROUND

In many modern computing systems (including desktop, laptop, notebook, netbook, tablet and smartphone computing systems), concurrent execution of multiple processes has become more and more of a mainstream runtime environment. A process is the execution of a sequence of code to accomplish a particular task. Concurrent execution of multiple processes is the concurrent execution of multiple sequences of code during the same period of time to accomplish multiple tasks corresponding to each process.

In the case of computer application programs, application developers may wish to utilize multiple processes for their particular application. However, writing application software for a multi-process environment presents several challenges. One issue pertains to inter-process communication. In certain cases, for example, applications may be designed to take advantage of services provided by other applications or by an operating system running on a computing device. These services may be a set of computer implemented instructions designed to implement a specific function or perform a designated task. An application may call (e.g., make use of) one or more of these services to avoid redundant software code for commonly performed operations.

In certain inter-process communication environments, all available services may be found in a global namespace, where each service is identified by a unique name or other identifier. Thus, all applications in the computing system have access to all of the available services. Here, the calling of a particular service is likely to be a function of a particular "state" of the application (e.g., the values of the application's variables). It is possible that, because of the application's state, some services have little or no likelihood of being called by the application. Thus, it is probable that the some of the services will be unnecessarily instantiated in memory. In addition, there are security risks associated with allowing an application indiscriminate access to all services available in a computing system. Furthermore, an application that publishes a service does not have the ability to restrict what other applications are allowed to access the service.

SUMMARY OF THE DESCRIPTION

Embodiments are described for service discovery using linked frameworks. In one embodiment, when an application is launched, a framework scanning module may scan a plurality of frameworks linked against by the application to generate a list of available services. When the application makes a request of a particular service, a service verification module may compare the requested service to the list of available services and if the requested service is found in the list of available services, send a signal to the application, the signal allowing access to the requested service for the application.

In one embodiment, the service verification module may further determine if the requested service is an application defined service stored with the application. If the requested service is an application defined service, the verification module may add the application defined service to the list of available services. If the requested service is not found in the list of available services, the services verification module may deny the application access to the requested service. The service verification may identify an instance designation of the requested service. The instance designation may be, for example, a global instance, a per-user instance or a per-application instance. If the instance designation is a global instance, the service verification module may allow access to a global instance of the service. If the instance designation is a per-user instance or per-application instance, the service verification module may instantiate a new instance of the requested service, unless a per-user or per-application instance has already been instantiated.

BRIEF DESCRIPTION OF THE DRAWINGS

The present invention is illustrated by way of example, and not by way of limitation, in the figures of the accompanying drawings.

FIG. 2B is a block diagram illustrating a table of services discovered using linked frameworks, according to an embodiment.

DETAILED DESCRIPTION

Figure 1:
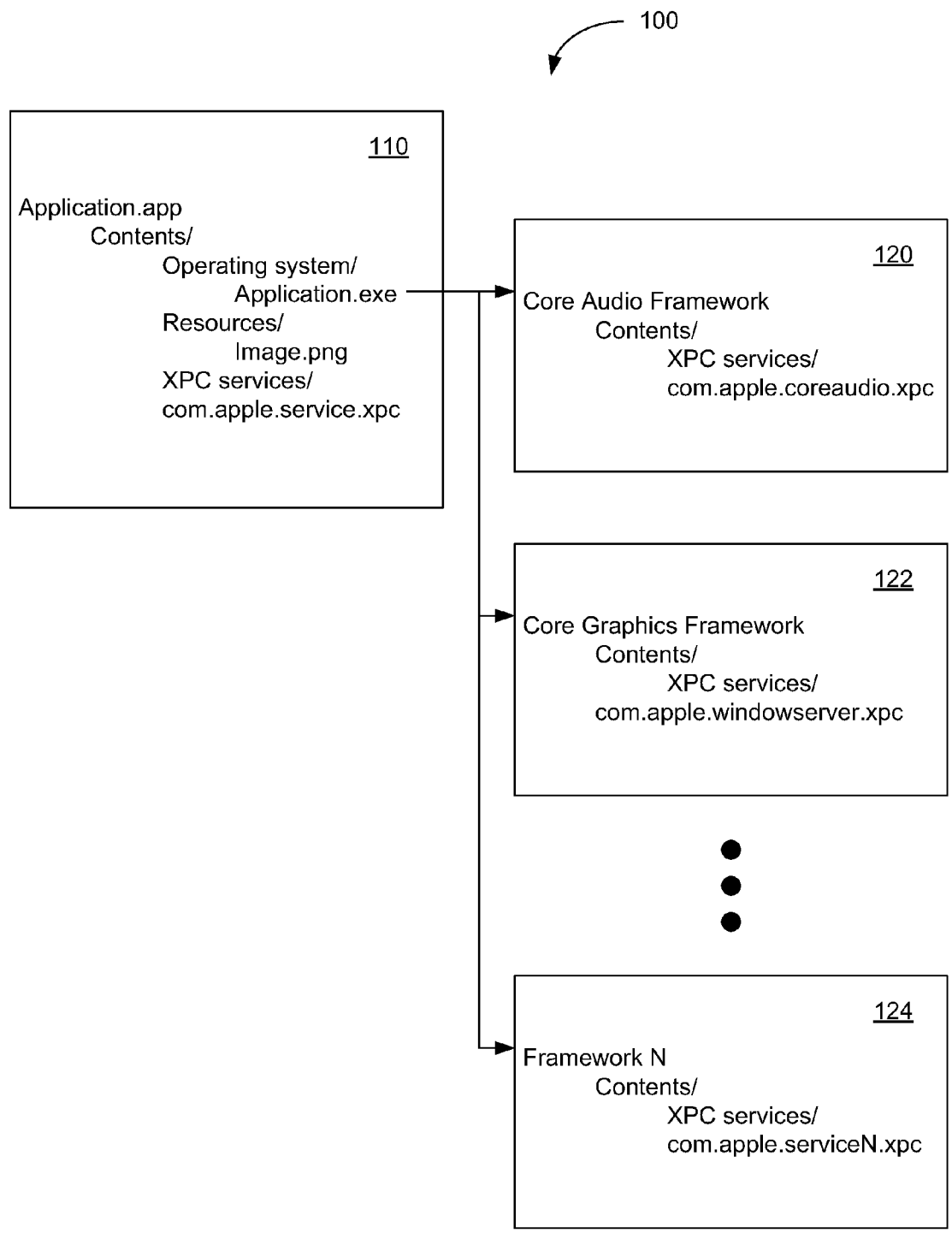
FIG. 1 is a block diagram illustrating a computer application program architecture, according to an embodiment.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Embodiments are described for service discovery using linked frameworks. In one embodiment, a framework scanning module may identify all of the services available in an application itself and in frameworks that the application links against. When an application calls a particular service, a service verification module may compare the requested services to a list of available services identified by the framework scanning module. If the requested service is found in the list of available services, the service verification module may allow the application to access the requested service. This may lead to a more efficient use of memory resources as the system can load a service into memory only when it is needed, or at least when a state of the application is such that there is an increased likelihood that the service might be needed. Moreover, further memory efficiencies may be realized if a determination is made that a particular service that has been loaded into memory is apt not to be called upon again. In this case, the unused service may be terminated, allowing the region of memory where the service's corresponding block of code resides to be made available for other system uses.

With dynamic service discovery, the list of available services for an application may be computed when the application starts and discarded when the application is exited. There is no explicit registration operation to place services into a namespace, as the set of available services is derived from the constituents of the application. The application defined services within the application bundle are found regardless of where the application is located in the system (e.g., on local disk, network fileserver, removable media). This allows the dynamic list of services available to an application to be unique for each application, rather than a shared global namespace. The service discovery technique described herein also offer security advantages. Packaging a service within a framework ensures that an application is only allowed access to services in frameworks that the application links against (i.e., makes use of). Thus, an application can only call known, predefined, or expected services, rather than every service available in the system. These services may be a set of computer implemented instructions designed to implement a specific function or perform a designated task.

FIG. 1 is a block diagram illustrating a computer application program architecture, according to an embodiment of the present invention. In one embodiment, architecture 100 includes application bundle 110. Application bundle 110 may be representative of a computer application program (application) designed to run on a computing system, such as for example, a desktop, laptop, notebook, netbook, tablet, smartphone, or other computing system. The computer application program may be any computer software application designed to help a user perform singular or multiple related specific tasks. Application bundle 110 may be a directory that allows related resources, such as software code, to be grouped together. In one embodiment, application bundle 110 may be identified by the ".app" extension (e.g., "Application.app"). Application bundle 110 may include a number of directories and/or subdirectories, such as "Contents," "Operating system," which may contain the application's executable code, identified, for example, by the ".exe" extension (e.g., "Application.exe", however in other embodiments, the executable file may have another extension or may not include an extension), "Resources," which may contain resources of the application (e.g., "Image.png"), and "XPC services," which may contain application defined services. These services may be a set of computer implemented instructions designed to implement a specific function or perform a designated task. In one embodiment, the application defined services are services which are available only to the application represented by application bundle 110. In addition, these application defined services may be tied to the lifetime of the application, in that once the application is terminated, the service is no longer available.

In one embodiment, the executable code in application bundle 110 may link against one or more frameworks in architecture 100. Frameworks may include software libraries having reusable abstractions of software code wrapped in a well-defined application programming interface (API). The frameworks allow software developers to implement the standard structure of an application for a specific development environment (e.g., the operating system running on the computing device). The frameworks linked against by an application may be represented by framework bundles 120, 122, 124. Some examples of commonly used frameworks may include core audio framework 120 and core graphics framework 122. Framework N 124 may represent any other framework linked against by the application. The frameworks illustrated in FIG. 1 are merely exemplary, and in other embodiments, there may be any number of other frameworks present in the architecture 100. The executable files in an application may link against the frameworks by storing a framework name or other identifier of framework bundles 120, 122, 124 in a designated location in application bundle 110 and/or by calling an API provided by the associated framework.

Similarly to application bundle 110, each of framework bundles 120, 122, 124, may include a number of directories and/or subdirectories, such as "Contents," "Resources," and "XPC Services." The "XPC Services" subdirectory may contain a list of services contained within the framework. For example, core audio framework 120 may contain the "coreaudio.xpc" service and core graphics framework 122 may contain the "windowserver.xpc" service. In one embodiment, the services are identified by the ".xpc" extension, however, in other embodiments, different extensions may be used. The services illustrated in FIG. 1 are merely exemplary, and in other embodiments, there may be any number of other services present in application bundle 110 and/or framework bundles 120, 122, 124.

The services included in framework bundles 120, 122, 124 may be made available to a number of different applications that are all linking against the same framework. In one embodiment, there may be a single global instance of a particular service in a framework that is available to a certain number of different applications. In another embodiment, there may be an individual instance of a particular service that is instantiated for each user of the system, or an instance of the service for each application that is running in the system. In other embodiments, each service may have a different designation as a global instance, a per-user instance, or a per-application instance, where there may be services of each type present at the same time in the same or different framework(s). In addition, some other instance may be created at the discretion of the framework. For example, one framework may have one instance for each browser tab or window that is opened. Each instance may be identifiable by a universal unique identifier (UUID).

At the time an application is built, the application designer may specify what services are defined specifically in the application, as well as what frameworks the application will link against. The application designer may also have knowledge of what services are contained within those frameworks. Thus, between the application defined services and the services in linked frameworks, the application designer is able to grant access to all of the services that the application executable file needs or may be likely to access. In addition, the application designer is able to specify which services the application executable file is allowed to access. Therefore, unnecessary and unauthorized services are not made available to the application.

Figure 2A:
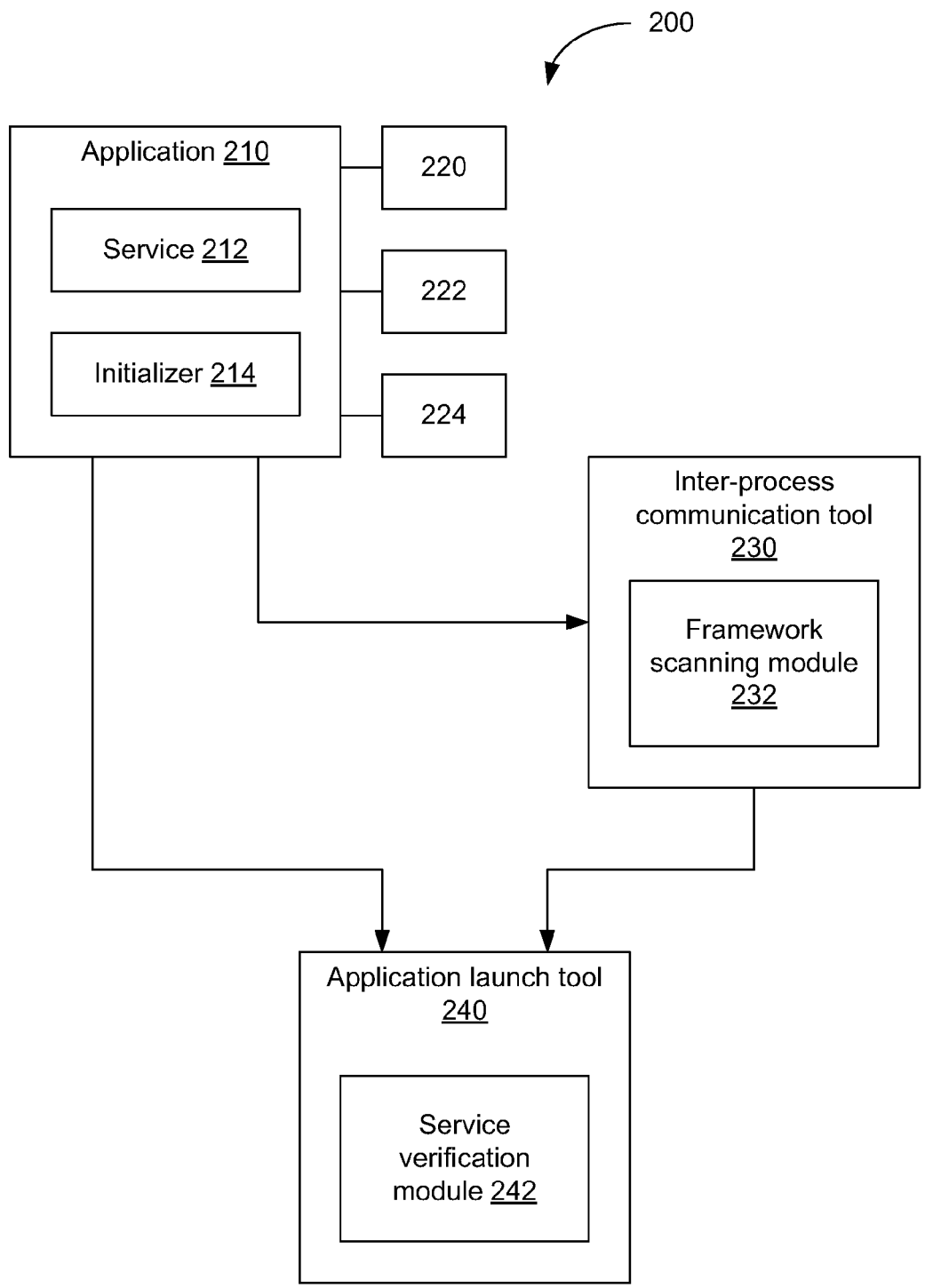
FIG. 2A is a block diagram illustrating an inter-process communication environment, according to an embodiment.

FIG. 2A is a block diagram illustrating an inter-process communication environment, according to an embodiment of the present invention. In one embodiment, the environment 200 includes computer application program 210, frameworks 220, 222, 224, inter-process communication tool 230, and application launch tool 240. Application 210 may be one example of an application represented by application bundle 110 in FIG. 1. Application 210 may include one or more application defined services 212 contained directly within the application itself. These application defined services 212 may be provided to application launch tool 240 and added to a list of available services, maintained for example by service verification module 242. Application 210 may further include initializer module 214 which identifies and initializes the frameworks that application 210 links against. The frameworks that application 210 links against may be found in a designated subdirectory of the application bundle or the application 210 may reference a filesystem location of the frameworks. Frameworks 220, 222, 224 may be examples of frameworks represented by framework bundles 120, 122, 124, and may each include one or more services, as described above with respect to FIG. 1.

Inter-process communication tool 230 may include framework scanning module 232. Framework scanning module 232 may receive a list of frameworks that application 210 links against. The list may be provided by initializer module 214. Framework scanning module 232, scans the frameworks provide by initializer module 214 to identify the services contained within frameworks 220, 222, 224. The services may be identified during the scan by a known extension (e.g., ".xpc") or an identifier. In addition, the services may be found in a designated subdirectory of the framework bundle. Framework scanning module 232 may generated a list of available services, which it provides to application launch tool 240.

FIG. 2B is a block diagram illustrating a table of services discovered using linked frameworks, according to an embodiment of the present invention. Table 250 represents the services identified by framework scanning module 232 in the frameworks 220, 222, 224 that application 210 links against. In other embodiments the data in table 250 may be stored in a list, database, or other data structure. In one embodiment table 250 is provided by framework scanning module 232 and stored with service verification module 242 in application launch tool 240. Table 250 may include a service name column 252, a path column 254 and an instance designation column. Service name column 252 may include a name or other identifier of an identified service (e.g., "com.apple.coreaudio.xpc"). In other embodiments, some other identifier may be used. Path column 254 may include the path where the files and code associated with the service may be located. Instance designation column 256 may include the designation of the instance as a global instance, a per-user instance, a per-application instance, or other designation. Table 250 may include an entry for each identified service for a particular application as well as those application defined services stored directly in the application bundle. In other embodiments, table 250 may include additional or less information.

When the executable code of application 210 is run, it may call a service at some point during its operation. Referring back to FIG. 2A, application launch tool 240 runs the executable code and when a service is called, a service verification module 242 verifies whether the application 210 is authorized to access the requested service. Service verification module 242 compares the requested service to the list of available services (e.g., table 250) provided by framework scanning module 232 and application 210. If the requested service is found in the list of available services, (e.g., is an application defined service stored directly in application 210 or is found in one of linked frameworks 220, 222, 224), service verification module 242 authorizes the executable code to access the service (e.g., by making the appropriate API call), and execution of the application code continues. If the requested service is not found in the list of identified services, then service verification module 242 denies access to the service by the executable code.

Figure 3:
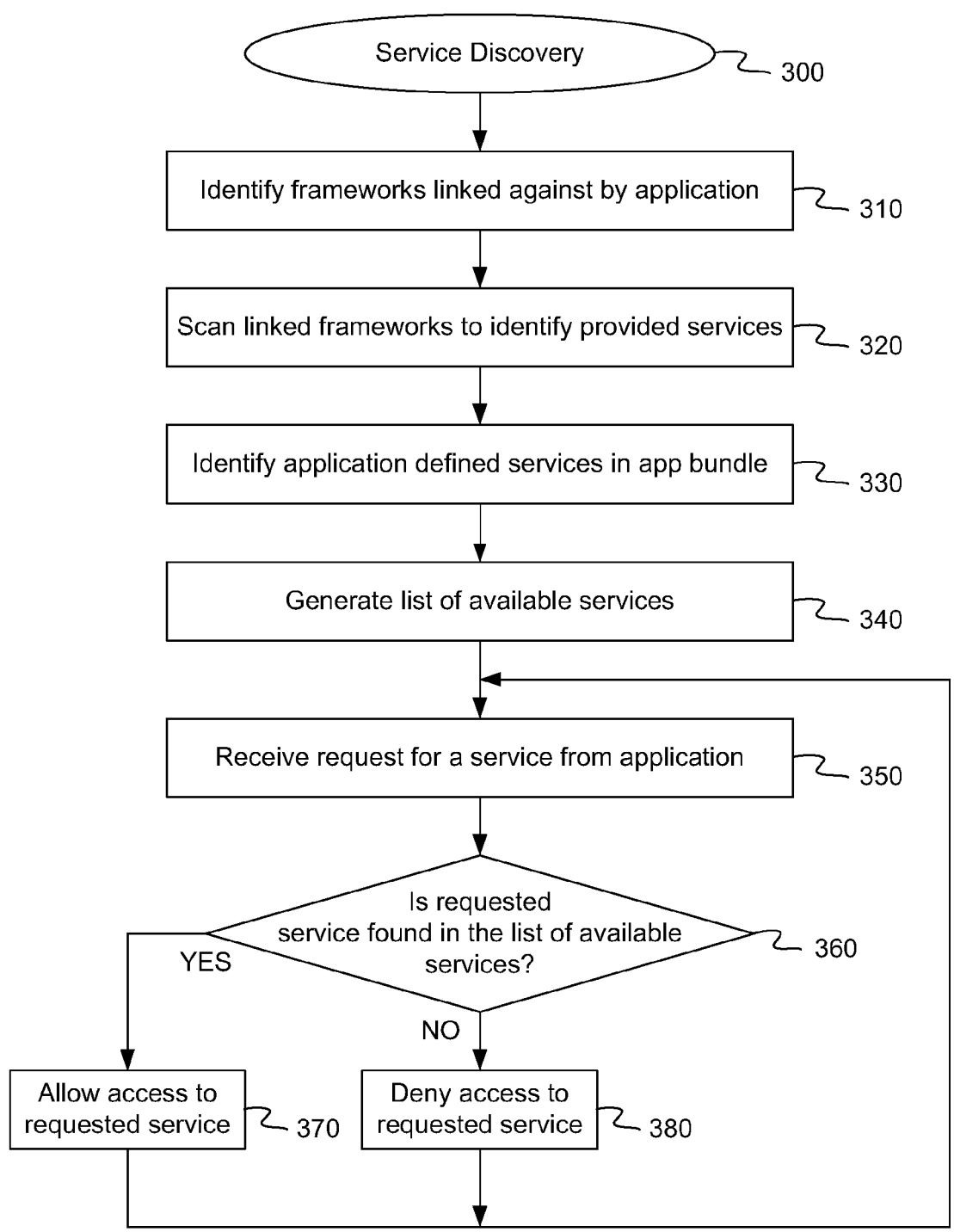
FIG. 3 is a flow chart illustrating a service discovery method using linked frameworks, according to an embodiment.

FIG. 3 is a flow chart illustrating a service discovery method using linked frameworks, according to an embodiment of the present invention. The method 300 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to discover one or more services available to a computer application program using linked frameworks. In one embodiment, method 300 may be performed by the software modules of inter-process communication environment 200, as shown in FIG. 2A.

Referring to FIG. 3, at block 310, method 300 identifies frameworks 220, 222, 224 that a computer application program 210 links against. An initializer module 214 may examine an application bundle corresponding to application 210 and look for framework names or other identifiers stored in a designated section of the bundle. At block 320, method 300 scans the linked frameworks 220, 222, 224 to identify services provided by each framework. A framework scanning module 232 may examine a framework bundle corresponding to each linked framework 220, 222, 224 and look for service names or other identifiers stored in a designated section of each framework bundle. At block 330, method 300 identifies the application defined services stored directly in the application bundle corresponding to application 210. Service verification module 242 may receive information about what application defined services are stored in the application bundle when the application is initialized or along with a request to access a particular service. The application defined services may be identified by a particular service extension or other identifier, or may be found in a designated subdirectory of the application bundle. At block 340, method 300 generates a list of the available services. Framework scanning module 232 may compile the services identified in the frameworks that are linked against into a list, table, database, or other data structure and provide the list to service verification module 242. The list represents all of the services in the linked frameworks that the application 210 is likely and/or authorized to access during execution. This list may be combined with the application defined services identified at block 330 to represent all of the available services for application 210.

Figure 4:
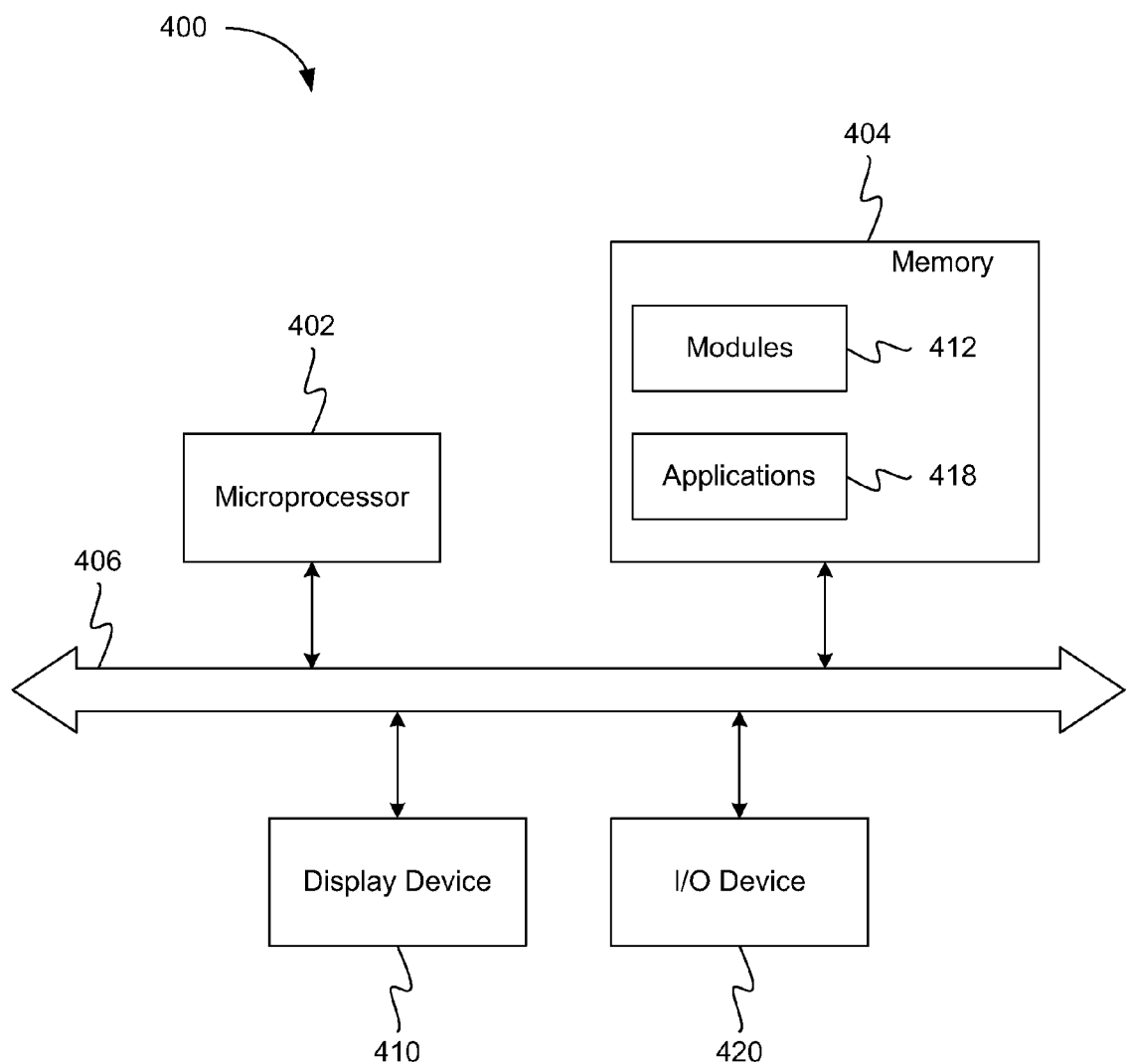
FIG. 4 is a block diagram illustrating a data processing system according to one embodiment.

When the executable code of application 210 is run, either automatically or in response to a user input, the code may be sequentially executed by a processing system, such as processing system 400, shown in FIG. 4. Certain instructions in the code may cause the application to call a service at some point during its operation. At block 350, method 300 receives a request for a service from application 210. Application launch tool 240 runs the executable code from the application and when a service is called, service verification module 242 may receive the request for the service. At block 360, method 300 determines if the request service is found in the list of available services. Service verification module 242 may compare a name or identifier of the requested service with the list of available services. In one embodiment, service verification module 242 may read available service table 250 to determine if the identifier matches an entry in the table. If the requested service matches one of the services in the list of available services, at block 370, method 300 allows the executable code of application 210 to access the requested service. Application launch tool 240 may send a signal to application 210, the signal indicating that access to the requested service has been granted. When access is granted, the service may be published to a private namespace of services for the application. The executable code may call an API provided by the requested service in order to initiate the functions provided by the service. Application launch tool 240 may additionally identify the designation of the service as a global instance, a per-user instance, or a per-application instance, and either start a new instance of the service or provide access to an already existing instance, as appropriate. For a global instance, launch tool 240 may allow access to the already existing global instance of the service. For a per-user or per-application instance, launch tool 240 may instantiate a new instance of the service, unless a per-user or per-application instance already exists. In that case, launch tool 240 may allow access to the already existing per-user or per-application instance. In one embodiment, if the same application were to run more than once, then each instance of the application could have its own instances of per-application services. In other embodiments with other instance designations, launch tool 240 may check for a UUID of the requested instance and if the UUID already exists, launch tool 240 may allow access to the instance.

Under normal conditions, it is unlikely that an application may request a service not found in the list of available services. However, due to software errors, or if the application is maliciously modified (e.g., by a virus, malware, hacker, or other application), an application may request a service not found in the list of available services. If at block 360, method 300 determines that the requested service is not found in the list of available services, method 300 proceeds to block 380. At block 380, method 300 denies access to the requested service. After either allowing or denying access to the requested service at blocks 370 and 380 respectively, the application 210 continues execution and method 300 returns to block 350 to wait to receive a subsequent request to access a service.

FIG. 4 illustrates a data processing system according to one embodiment of the present invention. The system 400 may include a processing device, such as processor 402, and a memory 404, which are coupled to each other through a bus 406. The system 400 may also optionally include a display device 410 which is coupled to the other components through the bus 406. One or more input/output (I/O) devices 420 are also connected to bus 406. The bus 406 may include one or more buses connected to each other through various bridges, controllers, and/or adapters as is well known in the art. The I/O devices 420 may include a keypad or keyboard or a cursor control device or a gesture-sensitive device such as a touch or gesture input panel.

Memory 404 may include modules 412 and application 418. In at least certain implementations of the system 400, the processor 402 may receive data from one or more of the modules 412 and application 418 and may perform the processing of that data in the manner described herein. In at least certain embodiments, modules 412 may include initializer module 214, framework scanning module 232, and service verification module 242. Processor 402 may execute instructions stored in memory on image data as described above with reference to these modules. Applications 418 may include a phone application, an SMS/MMS messaging application, a chat application, an email application, a web browser application, a camera application, an address book application, a calendar application, a mapping application, a word processing application, a photo application, or other applications.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing devices.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
   scanning, by a data processing system, a plurality of frameworks linked against by an application to generate a list of available services;
   receiving a request for a service from the application;
   comparing the requested service to the list of available services;
   if the requested service is found in the list of available services, sending a signal to the application, the signal allowing access to the requested service for the application;
   determining if the requested service is an application defined service; and
   if the requested service is an application defined service, adding the application defined service to the list of available services.

2. The method of claim 1, wherein:
   the requested service is an application defined service stored with the application.

3. The method of claim 1, further comprising:
   if the requested service is not found in the list of available services, denying the application access to the requested service.

4. The method of claim 1, further comprising:
identifying an instance designation of the requested service, wherein the instance designation comprises one of a global instance, a per-user instance and a per-application instance.

5. The method of claim 4, further comprising:
if the instance designation is a global instance, allowing access to a global instance of the service.

6. The method of claim 4, further comprising:
if the instance designation is a per-user instance or per-application instance, instantiating a new instance of the requested service, unless a per-user or per-application instance has already been instantiated.

7. The method of claim 1, wherein the application accesses the service by making a corresponding application programming interface (API) call.

8. A system, comprising:
a processor; and
a memory coupled to the processor, the memory storing:
a framework scanning module configured to scan a plurality of frameworks linked against by an application to generate a list of available services; and
a service verification module, configured to compare a requested service to the list of available services and if the requested service is found in the list of available services, send a signal to the application, the signal allowing access to the requested service for the application, the service verification module configured to determine if the requested service is an application defined service, and if the requested service is an application defined service, the service verification module configured to add the application defined service to the list of available services.

9. The system of claim 8, wherein:
the requested service is an application defined service stored with the application.

10. The system of claim 8, wherein the service verification module is further configured to:
if the requested service is not found in the list of available services, deny the application access to the requested service.

11. The system of claim 8, wherein the service verification module is further configured to:
identify an instance designation of the requested service, wherein the instance designation comprises one of a global instance, a per-user instance and a per-application instance.

12. The system of claim 11, wherein the service verification module is further configured to:
if the instance designation is a global instance, allow access to a global instance of the service.

13. The system of claim 11, wherein the service verification module is further configured to:
if the instance designation is a per-user instance or per-application instance, instantiate a new instance of the requested service, unless a per-user or per-application instance has already been instantiated.

14. The system of claim 8, wherein the application accesses the service by making a corresponding application programming interface (API) call.

15. A non-transitory machine readable storage medium storing instructions which when executed cause a data processing system to perform a method comprising:
scanning, by a data processing system, a plurality of frameworks linked against by an application to generate a list of available services;
receiving a request for a service from the application;
determining if the requested service is an application defined services;
if the requested service is found in the list of available services, sending a signal to the application, the signal allowing access to the requested service for the application;
determining if the requested service is an application defined service; and
if the requested service is an application defined service, adding the application defined service to the list of available services.

16. The storage medium of claim 15, wherein:
the requested service is an application defined service stored with the application.

17. The storage medium of claim 15, wherein: the method further comprises:
if the requested service is not found in the list of available services, denying the application access to the requested service.

18. The storage medium of claim 15, wherein the method further comprises:
identifying an instance designation of the requested service, wherein the instance designation comprises one of a global instance, a per-user instance and a per-application instance.

19. The storage medium of claim 18, wherein the method further comprises:
if the instance designation is a global instance, allowing access to a global instance of the service.

20. The storage medium of claim 18, wherein the method further comprises:
if the instance designation is a per-user instance or per-application instance, instantiating a new instance of the requested service, unless a per-user or per-application instance has already been instantiated.

21. The storage medium of claim 15, wherein the application accesses the service by making a corresponding application programming interface (API) call.

* * * * *